(12) United States Patent
Baumgartner et al.

(10) Patent No.: US 7,076,876 B2
(45) Date of Patent: Jul. 18, 2006

(54) MACHINE FOR PRESENTING A TIRE WITH THE AXIS HORIZONTAL

(75) Inventors: Gérard Baumgartner, Mezieres (CH); Denis Bidon, Durtol (FR); Emil Willi Reppel, Falkenberg (SE)

(73) Assignee: Michelin Recherche et Technique S.A., Granges-Paccot (CH)

( * ) Notice: Subject to any disclaimer, the term of this patent is extended or adjusted under 35 U.S.C. 154(b) by 121 days.

(21) Appl. No.: 10/706,054

(22) Filed: Nov. 13, 2003

(65) Prior Publication Data

US 2004/0094272 A1 May 20, 2004

Related U.S. Application Data

(63) Continuation of application No. PCT/EP02/05334, filed on May 15, 2002.

(30) Foreign Application Priority Data

May 17, 2001 (FR) .................................. 01 06626

(51) Int. Cl.
*B21D 53/26* (2006.01)
(52) U.S. Cl. .................................. 29/894.31; 29/894.3
(58) Field of Classification Search ............. 29/402.01, 29/402.02, 402.03, 402.04, 402.09, 402.18, 29/403.1, 407.01, 407.09, 894, 894.3, 894.31, 29/894.37; 254/50.1–50.4; 73/146
See application file for complete search history.

(56) References Cited

U.S. PATENT DOCUMENTS

| 3,130,957 | A | * | 4/1964 | Branick ...................... 254/50.3 |
| 3,572,176 | A | | 3/1971 | Bildat |
| 4,083,421 | A | | 4/1978 | Van Horn et al. |
| 4,160,537 | A | * | 7/1979 | Severson ..................... 254/50.3 |
| 5,007,789 | A | * | 4/1991 | Painter ....................... 414/427 |
| 5,460,036 | A | | 10/1995 | Church |
| 5,879,265 | A | | 3/1999 | Bek |

FOREIGN PATENT DOCUMENTS

| DE | 1 655 194 B1 | 7/1971 |
| DE | 197 23 776 A1 | 12/1997 |
| EP | 0 700 805 B1 | 3/1996 |
| EP | 0 807 772 B1 | 11/1997 |

* cited by examiner

*Primary Examiner*—John C. Hong
(74) *Attorney, Agent, or Firm*—Buchanan Ingersoll P.C.

(57) ABSTRACT

A machine for presenting a tire with the axis horizontal, allowing access to the inside of the tire, which has a frame bearing an upright on which a support for the tire is mounted for vertical translation, the support ensuring on its own the holding and rotation of the tire about its axis by being in contact with the latter solely via a toric section of the tire, this section being arranged substantially vertically when the tire is installed on the machine.

15 Claims, 6 Drawing Sheets

MACHINE FOR PRESENTING A TIRE WITH THE AXIS HORIZONTAL

The present application is a continuation of International Application No. PCT/EP02/05334, filed May 15, 2002, which was published as WO 02/092365 A1 on Nov. 21, 2002, and which is incorporated by reference.

The invention relates to a machine for presenting tires, intended in particular for inspecting the state of the inside and outside of a worn tire. Such machines generally constitute the first station in a recapping workshop for determining the state of the inside and outside of tires, but may, of course, also be used in the manufacture of new tires, for example, for quality control of these tires.

Hereinbelow, "inside" of a tire will be understood to mean the interior surface of the torus constituting the tire and "outside" of the tire will be understood to mean the exterior surface of the tread, the sidewalls and the beads of the tire.

It is known that the majority of tires can be recapped, that is to say that it is possible, after normal wear of the tread, to replace this tread, and even some reinforcement plies of the tire belt. These operations are very common for the tires of transport vehicles such as heavy vehicles and can be carried out in proper factories or in workshops of greater or lesser size where problems of space are of great importance.

Nowadays, there is an increasing demand for "flexible" presentation machines capable of accepting tires of a wide range of sizes, and even of performing a number of operations, such as, for example, checking the inside and outside of the tire, repairing the tire or buffing the tire with a view to recapping it.

A common type of existing presentation or inspection machine possesses a frame bearing a flange intended to receive one of the sides of the tire to be inspected, the latter being arranged with its axis of rotation horizontal, and bearing a support cooperating with the flange, arranged under the tire, to hold this tire in position. An arm bearing fingers for spreading the beads of the tire is generally arranged on the accessible side of the tire, i.e. the one opposite the flange.

It is clear that such machines are both bulky and limited in the range of the sizes of tires accepted.

Moreover, there are also other operating difficulties with this type of presentation machine. Namely, it is necessary, in order to carry out a full inspection of the inside of a tire, given that the accessibility is limited to one side of the latter, to inspect each side separately by removing the tire after inspection of the first side and reinstalling it on the machine after rotation through 180° relative to its equatorial plane. It is clear that, on the one hand, this double operation considerably increases the length of the inspection and, on the other hand, necessitates additional handling to turn the tire round, which is not inconsiderable in view of the fact that the tires concerned are generally of very large sizes.

Other types of solutions propose machines for presenting tires with the axis horizontal, in which the tire is brought up with the aid of a ramp until it rests on a horizontal support bearing two rollers, at least one of which is motorised to allow the rotation of the tire on the support. Such a support also bears two arms equipped with fingers for spreading the beads of the tire, respectively positioned on each side of the tire. A device allows, in some cases, the level of this support to be raised after the tire has been put in place, although this raising remains limited. This is because the known devices consist either of parallelograms, the raising of which is limited owing to the space that they necessarily take up and the rigidity problems, or of systems in which the upward movement is limited by the fixed vertical positioning of the ends of the arms.

Such machines allow more efficient inspection of a tire than the presentation machines considered above, since the tire is in this case generally accessible from both sides simultaneously. However, the support and arm assembly encroaches on the preferred location for an operator to observe the inside of the tire. The operator is therefore forced to adopt uncomfortable positions in which, in particular, he is continuously leaning forwards. This type of machine has therefore proved to be very unergonomic.

According to the invention, the machine for presenting a tire with the axis horizontal, allowing access to the inside of the tire, has a frame bearing an upright on which a support for the tire is mounted for vertical translation, the support ensuring on its own the holding and rotation of the tire about its axis by being in contact with the latter solely via a toric section of the tire, this section being arranged substantially vertically when the tire is installed on the machine.

Surprisingly and contrary to the knowledge and experience of a person skilled in the art in terms of tire presentation or inspection machines, this machine is able to hold a tire up with the axis horizontal merely by gripping its circumference laterally while allowing the operator access to the inside of the tire without any risk and while permitting its rotation as well. For reasons of weight, since, as has already been stated, the tires are generally of large sizes, of stability and of guaranteed holding relative to the operator, the machines generally hold a tire by a first anchorage supporting the tire and arranged under the latter, and by second, lateral anchorages formed by the arms.

According to one feature of the invention, the support for the tire has first means for supporting the tire, second means for holding and spreading the beads of the tire and third means for supporting and rotating the latter about its axis, these three means forming a triangulation system guaranteeing the grasping of the tire and its stable holding in the working position of the machine.

This triangulation system is sufficient, contrary to the a priori knowledge of a person skilled in the art, to be able to grasp a tire while guaranteeing its proper holding and its stability.

BRIEF DESCRIPTION OF THE DRAWINGS

Other features and advantages of the invention will become apparent from an exemplary embodiment of a machine according to the invention with reference to the drawing, in which.

DETAILED DESCRIPTION

Hereinbelow, the axes X'X, Y'Y and Z'Z shown in the figures will be used to denote the lateral, vertical and transverse directions, respectively.

Figure 1:
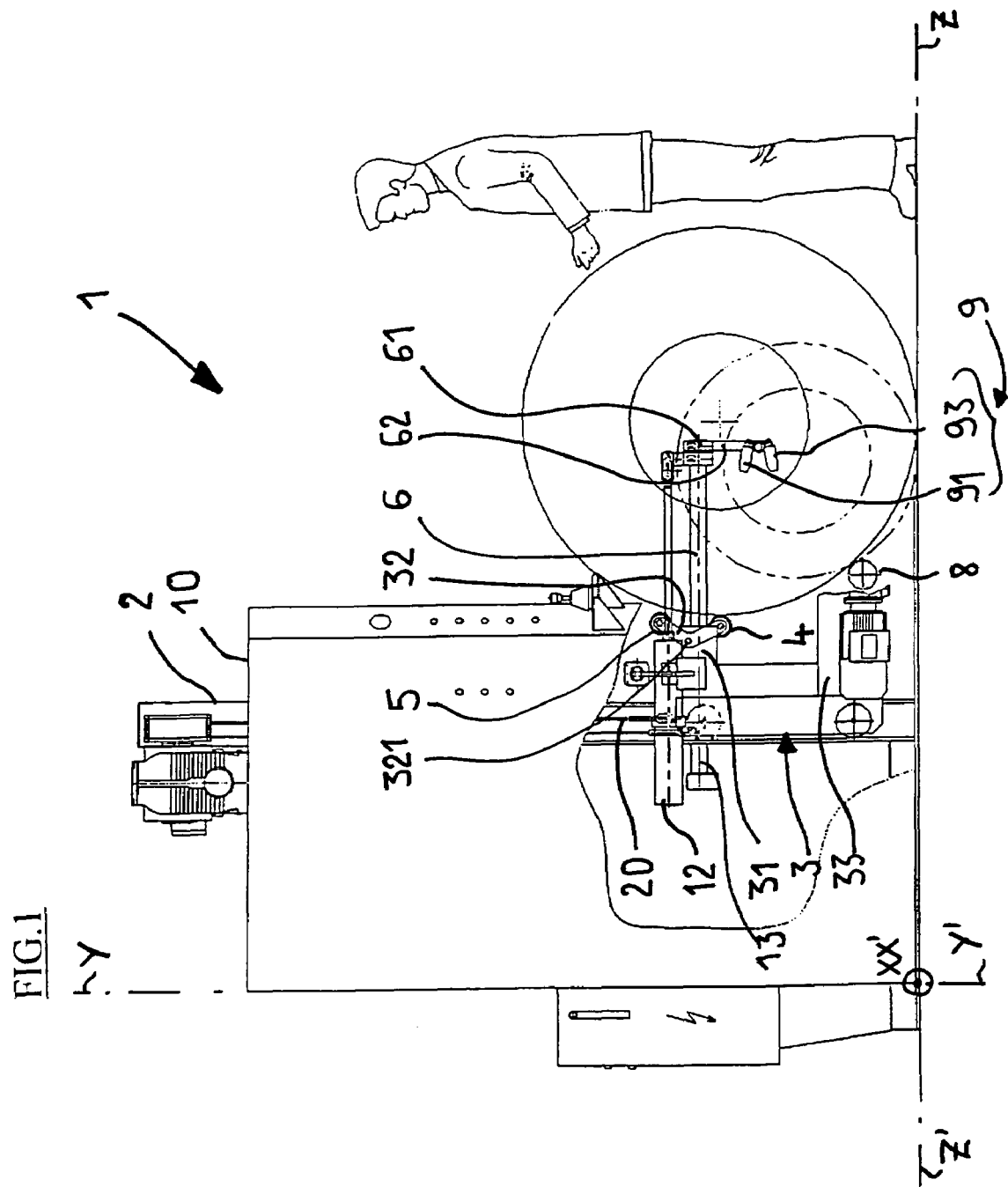
FIG. 1 is a partial vertical section of a machine according to the invention in which two tires of different sizes are shown in the rest position.

According to FIG. 1, the machine 1 has a frame 10 which comprises an upright 2 directly fixed to the floor of the factory or the workshop. Mounted on this upright 2 for vertical translation is a support 3 for receiving a tire "with the axis horizontal", that is to say that the axis of rotation of the tire arranged on the support is in a horizontal plane. This support is driven by means of a cable 20 and a control device, such as a push-button (not shown), which allows the operator to arrest the travel of the support at the height of his choice and therefore to choose the height at which the tire will be presented in accordance with his own height and the size of the tire.

The support 3 bears first means 4, 5 for supporting the exterior surface of the tire, second means 6, 7 for holding the tire on the machine and spreading the beads of the tire, and third means 8 arranged to underlie a toric section of the tire for supporting and rotating the tire about its axis x.

The first supporting means are formed by two rollers 4 and 5 mounted, so as to rotate freely about mutually parallel axes oriented in the lateral direction, on an end 31 of the support 3 by way of a lever 32 mounted on the end, the axis of rotation of the tire to be presented being itself parallel to these axes.

Advantageously, the lever 32 is mounted so as to rotate freely about the axis 321, thereby in particular allowing the machine to accept tires in a greater range of sizes.

Figure 2:
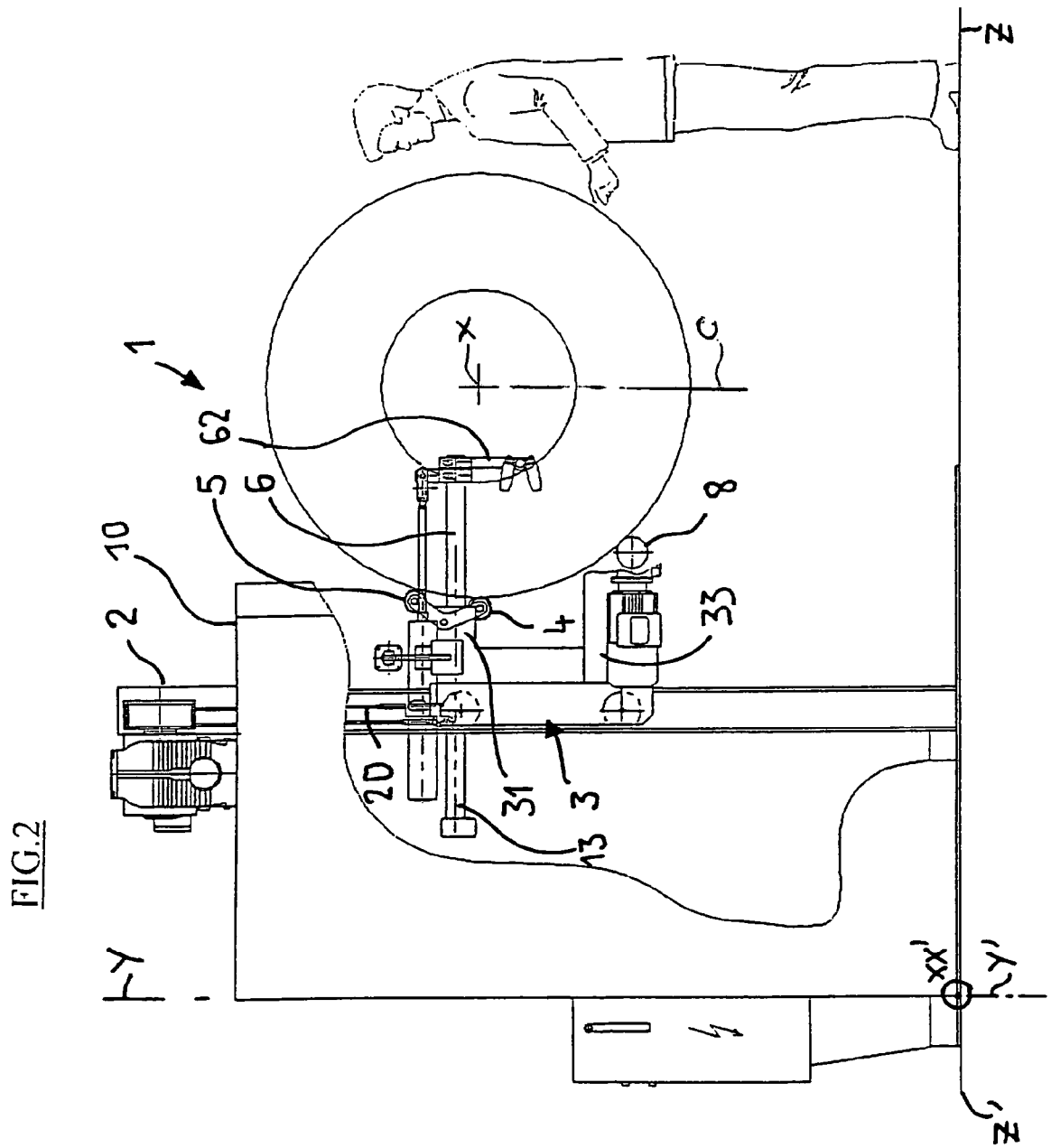
FIG. 2 is a partial vertical section of the machine according to the invention in a working position for one of the tires shown in FIG. 1.
Figure 3:
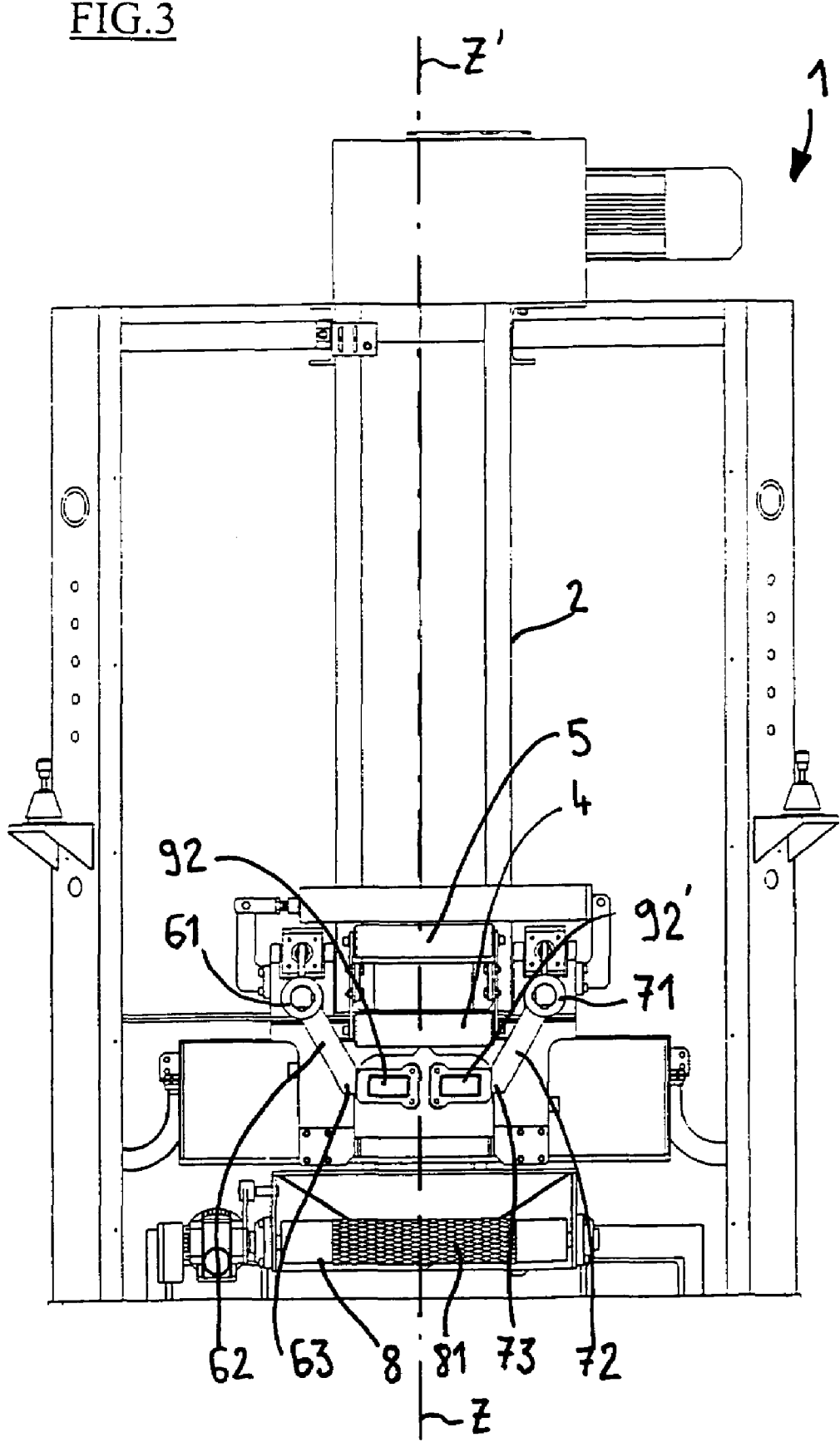
FIG. 3 is a representation, in front view, of the presentation machine according to the invention.
Figure 6:
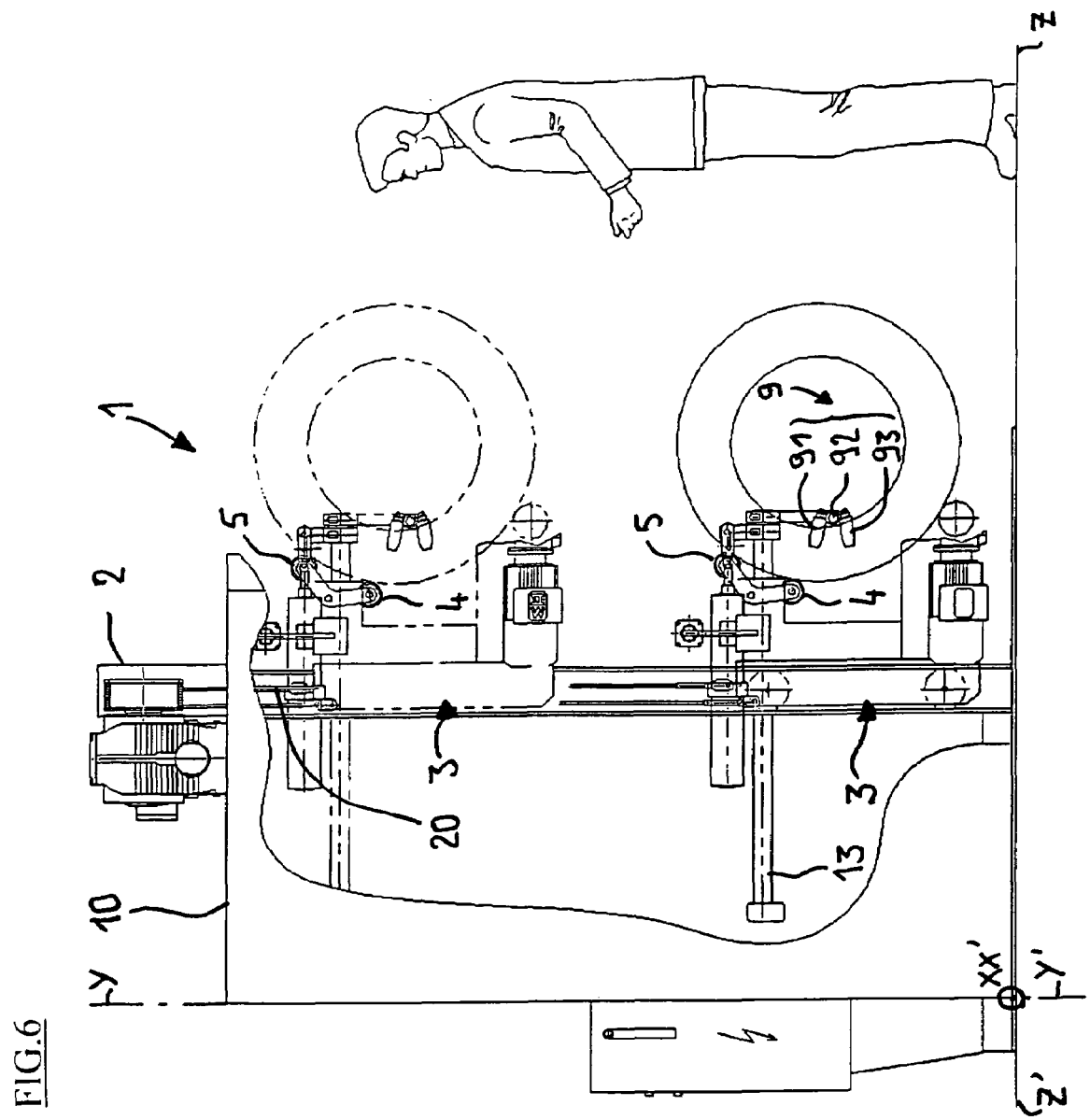
FIG. 6 is a partial vertical section of the machine according to the invention for one of the tires shown in FIG. 1 in two operating positions of the machine.

It can also be envisaged that the first supporting means are formed by a single roller, although the presence of two rollers stabilises the position of the tire which comes into contact with the two rollers simultaneously, as clearly shown in FIGS. 2 and 6, and allows, as stated above, the range of tire sizes accepted by the machine to be extended.

The third supporting and rotating means comprise a motorised roller 8 with the axis parallel to the lateral direction, the exterior surface of which is covered by a sleeve 81 bearing grooves so as to drive the tire rotationally when in contact. Other systems facilitating the rotational driving by the roller 8 can be envisaged, such as a grating for example.

The motorised roller 8 is mounted on one of the ends 33 of the support 3. The ends 31 and 33 of the support 3 are shown in FIG. 1, the end 31 being arranged vertically above the end 33, and therefore the rollers 4 and 5 being arranged above the roller 8, although a reversal of these two positions can also be envisaged.

The second means for holding the tire are formed by two parallel arms 6, 7 which extend in the transverse direction and the ends of which form an elbow 61, 71 and bear forearms 62 and 72. The forearms 62 and 72 extend in a vertical plane, their free ends 63 and 73 bearing respectively a system of fingers 9, 9' for spreading the beads of the tire to be presented.

The arms 6 and 7 are mounted to be translatable in the lateral direction relative to the support 3 so as to come closer to or, conversely, move away from each other. This coming closer allows the tire to be put in place and then held in position, which holding, as will be seen hereinbelow, nevertheless allows the tire to turn about its axis of rotation. It is possible to provide advantageously a device (not shown) in the form of a rack and pinion for example, in order to ensure the synchronism and the symmetry of the translational movements of the two arms 6 and 7.

The ends of the arms 6 and 7 are also translatable in the transverse direction. To that end, the movement in the transverse direction is brought about by an actuator 12 mounted on each of the arms 6, 7 and the pressure of which can be regulated by the operator. This regulation allows, as will be seen in the description of the operation of the machine, an adaptation of the machine to the size of the tire. In order to ensure the synchronism of the arms in their transverse displacement, a connecting bar 13 connects the two arms 6 and 7 to each other, as shown in FIG. 6.

Each forearm 62, 72 bears, as has been stated, at its free end 63, 73 which is furthest from the support 3, a system of fingers 9, 9' for grasping the tire and spreading the beads of the tire.

Figure 4:
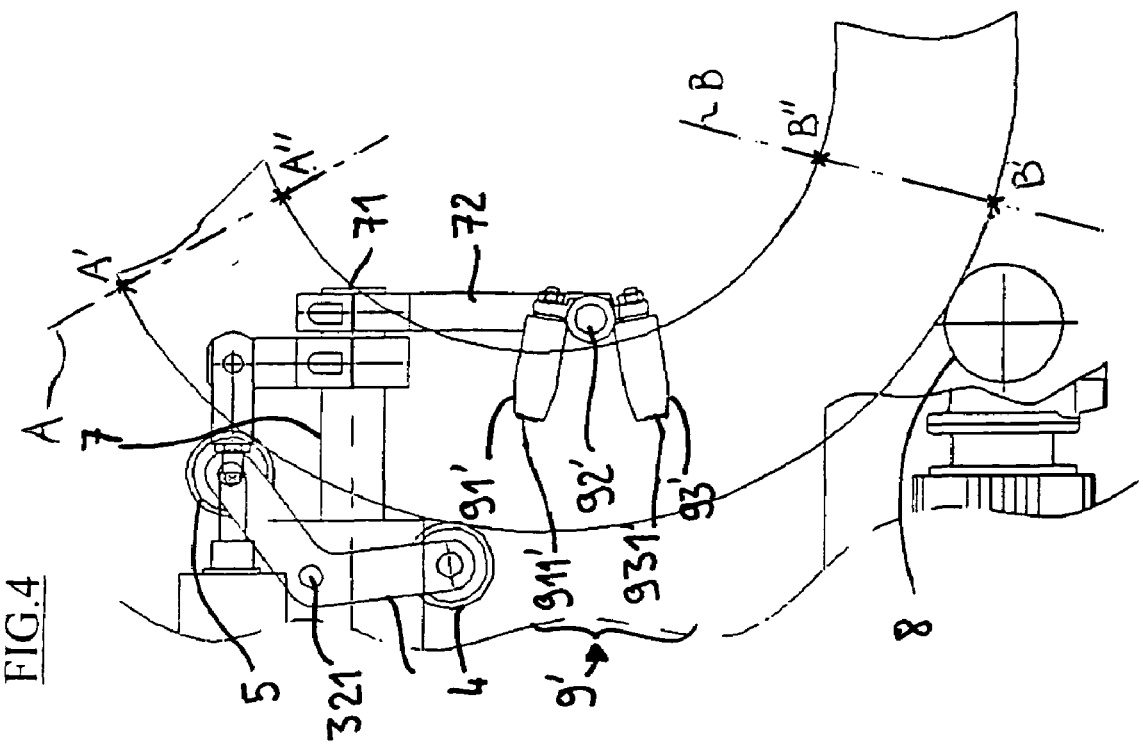
FIG. 4 is a partial vertical schematic section of certain elements of the machine shown in FIG. 1, FIGS. 5A to 5C are partial representations, in plan view, illustrating the operation of the machine.

Since the systems of fingers 9, 9' borne by each forearm 62, 72 are identical and symmetrical relative to a vertical plane parallel to the axes of the arms 6 and 7 passing through the center of the support, only one of these systems will be described here, with reference to FIG. 4.

The system 9' borne by the arm 7 consists of three fingers 91', 92' and 93' mounted so as to rotate freely on their shaft, two fingers 91' and 93' of which are fixed respectively by one of their ends on the free end 73 of the forearm 72 and oriented in a substantially transverse direction, whereas the third finger 92' arranged vertically between the other two is oriented in the lateral direction and fixed by way of the ends of its shaft to the end 73.

The free ends 911', 931' of the fingers 91' and 93', respectively, are oriented towards the inside of the presentation machine 1, forming a kind of return so as to ensure the holding and the spreading of the beads of the tire.

Furthermore, the fingers 91' and 93' are oriented symmetrically relative to a horizontal plane comprising the axis of the third finger 92', and their ends 911' and 931' are slightly spread from each other relative to this plane so as to ensure proper rotation of the fingers, the direction of their respective axis of rotation then being closer to the radial direction of the zone of the beads of the tire with which they are in contact.

The third finger 92' ensures the correct positioning of the tire at the time of the loading of the latter, through its contact with the bead, and, with the aid of the other two fingers 91', 93', the holding of the tire in position.

It should be noted that the operator may influence the pressure of the actuators in order to adjust it in accordance with the size of the tire, and therefore adjust the force of the finger 92' on the bead of the tire, a validation system at the same time maintaining a minimum pressure of the actuators in order to prevent a backward movement of the arms.

To allow a tire to be held with the aid of the three aforementioned means, a triangulation is produced between the three means which consists in positioning the two arms 6 and 7 vertically between the two rollers 4 and 5 and the motorised roller 8, the two rollers moreover not being in the same vertical plane as the motorised roller 8 and the systems of fingers 9 also being in a different vertical plane from the rollers 4, 5, so that the end of the arms 62, 72, the motorised roller 8 and the two rollers 4, 5 taken together, in a projection onto a vertical plane parallel to the arms, form a triangle.

Thus, a tire is held stably by the three means together by gripping only one toric tire section AB arranged substantially vertically and located between the upright 2 and a vertical plane C which contains the rotational axis X of the tire. This tire section AB shown in FIG. 4 and delimited by the radial section planes A and B is, in fact, such that the segments A'B' and A"B", respectively, are substantially vertical.

It is found therefore, surprisingly, given the weight of the tires under consideration, that this "lateral-gripping" triangulation system is sufficient to be able to grasp and hold the tire with complete security, including during the spreading of its beads and when it is rotating about its axis.

The aforementioned features of a machine according to the invention allow a great deal of flexibility with regard to the acceptance of the tires. In fact, such a machine will be able to receive tires irrespective of the shape of their beads, whether they are of small sizes (passenger car, for example) or large sizes (heavy vehicles, civil engineering, etc . . . ) and for tread widths ranging from 100 to 500 mm.

In what follows, the operation of a presentation machine according to the invention will be described briefly with reference to FIGS. 2, 4 and 5A to 5C. 9 denotes the finger system borne by the arm 6 and 9' that borne by the arm 7.

Figure 5C:
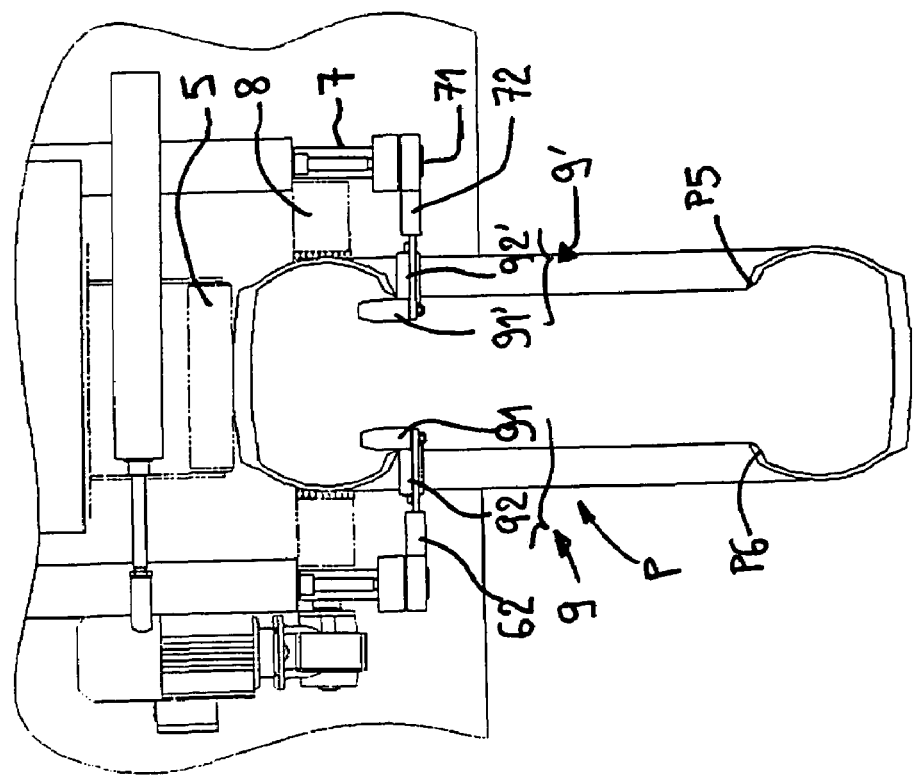
Figure 5A:
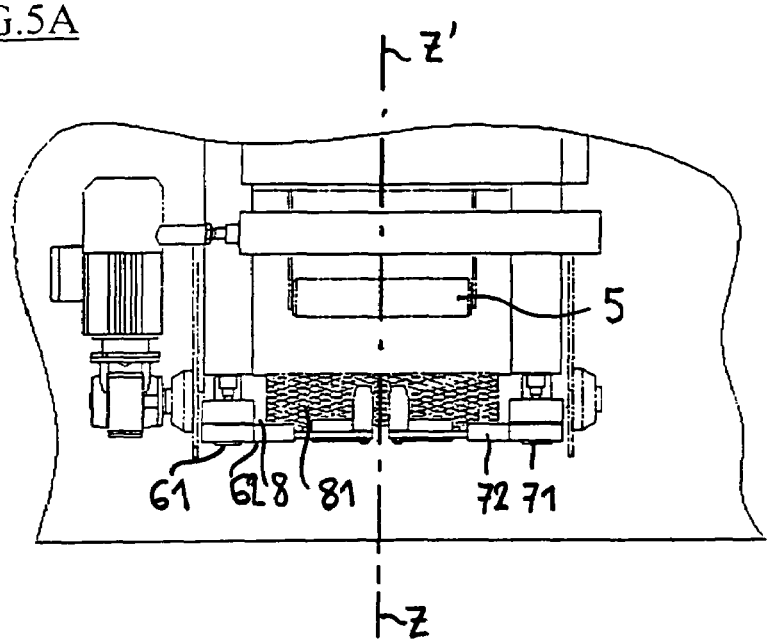

According to FIG. 5A, the presentation machine 1 is at rest: the support 3 is in its position closest to the floor as can be seen in FIG. 1, the arms 6 and 7 are retracted in the transverse direction Z'Z, that is to say that they are in their position closest to the support 3, the systems 9 and 9' of fingers being in their position closest to each other in the lateral direction X'X.

Figure 5B:
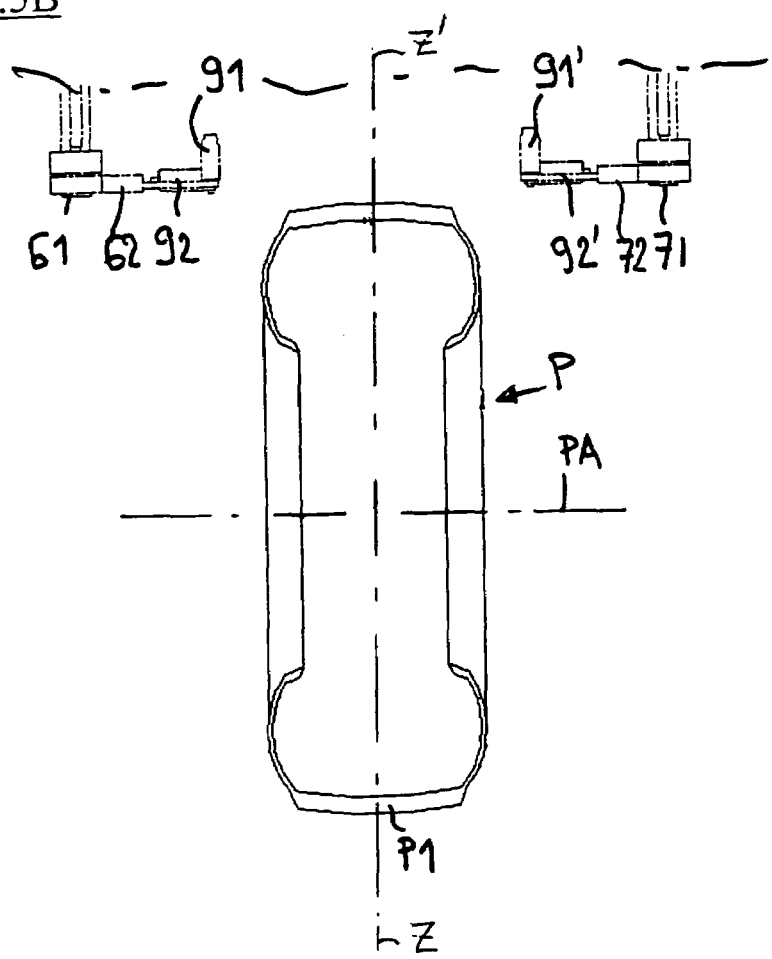

As shown in FIG. 5B, to receive a tire P, the arms 6 and 7 are moved away from each other laterally, their movement being synchronised by the rack device, and the arms are extended transversely relative to the support 3 by actuating the actuator.

The tire P is then presented with its axis of rotation PA in a horizontal plane and more precisely here parallel to the lateral direction X'X.

The tire is advanced in the transverse direction until its tread P1 is in contact with the motorised roller 8, as can be seen in FIG. 1. The projection of the systems of fingers 9 and 9' is then adjusted transversely so that they are arranged laterally opposite the cylindrical space delimited by the base of the beads of the tire P. Furthermore, the ensuring of the correct vertical positioning of the systems 9 and 9' relative to this cylindrical space is linked, during the manufacture of the machine, to the size range of the tires which are accepted, as emphasised above.

The arms 6 and 7 are firstly moved laterally closer until the fingers 91, 93 and 91', 93', respectively, enter the inside of the tire P and then retracted transversely until the beads P5 and P6 of the tire come into contact with the fingers 92 and 92'.

This is achieved by means of a minimal pressure so that there is contact between the tire and the upper freely rotating rollers 4 and 5, although this pressure can be adjusted by the operator in accordance with the sizes of the tires. This arrangement allows the tire to be held without subsequently preventing its rotation.

An adjustment of the lateral spacing of the arms 6 and 7 from each other is then made in order to ensure the contact between the beads P5 and P6 and the inside of the fingers 91, 93 and 91', 93', which position is shown in FIG. 5C.

It is then possible to raise the support 3 bearing the tire P to a height determined by the operator in accordance with his own height (FIG. 2).

Depending on the type of operation to be performed, the spreading of the beads of the tires P5 and P6 can then be carried out by moving the arms 6 and 7 away from each other again in the lateral direction until the fingers 91 and 93 (91', 93') exert a slight traction on the edges of the tire, allowing the desired spreading of the beads to be accomplished. This operation may also be performed during the rotation of the tire driven by the motorised roller 8.

The rotation of the tire may be effected in either direction, thereby allowing easy inspection of the whole of the tire simultaneously on both sides and over its entire circumference and provides the possibility of going back relative to the direction of the inspection if it is desired to have a look at something again.

It is clearly apparent that this presentation machine can be used equally well for performing inspecting, buffing, repairing, semifinished product- or covering-applying operations, etc. on the inside or the outside of the tire.

The invention claimed is:

1. Machine for presenting a tire having a road engaging crown linked with two beads by two lateral side-walls, the rotation axis of said tire being positioned horizontally, the machine allowing access to the inside of said tire and comprising a frame bearing an upright on which is mounted for generally vertical translation a tire support structure for raising and rotating a tire with its rotation axis oriented horizontally, the support structure arranged to contact solely a toric section of the tire located between the upright and a vertical plane containing the rotation axis.

2. Use of the machine according to claim 1, for inspecting the state of the inside and/or the outside of a tire.

3. Use of the machine according to claim 1, for buffing the inside and/or the outside of a tire.

4. Use of the machine according to claim 1, for repairing the inside and/or the outside of a tire.

5. Use of the machine according to claim 1, for applying semifinished products or coverings to the inside and/or the outside of a tire.

6. Machine according to claim 1, wherein the support structure includes support means in contact with the road engaging crown of the tire and arranged to underlie the toric section, and additional support means in contact with the beads of the tire for holding and spreading the tire beads, the support means and additional support means arranged for simultaneously supporting the tire as the tire is raised.

7. Machine according to claim 1, wherein the support structure for the tire comprises first support means for supporting the tire, second support means for holding and spreading the beads of the tire and third support means arranged below the first support means to underlie the toric section of the tire for supporting and rotating the tire about its axis, the first, second and third support means together forming a triangulation system ensuring the grasping of the tire prior to a raising of the tire and a stable raising and holding of the tire in a working position of the machine.

8. Machine according to claim 7, wherein the first means for supporting the tire comprises at least one freely rotating roller, the third supporting means comprises a motorised roller, the respective axes of these freely rotating and motorised rollers being mutually parallel and situated in horizontal planes, and the second means comprise arms with axes perpendicular to those of the rollers, wherein a projection of the free ends of the arms, of the center of the motorised roller and of the center of the free roller onto a vertical plane perpendicular to the axis of the rollers forming a triangle.

9. Machine according to claim 8, wherein the arms possess respectively a free end bearing a system with three fingers for gripping and spreading the beads of the tire to be presented.

10. Machine according to claim 9, wherein each system of fingers includes two fingers for spreading the tire beads, extending substantially in the transverse direction, and a third finger for positioning the system of fingers relative to the tire, arranged vertically between the other two and extending in the lateral direction.

11. Machine according to claim 8, wherein the first means comprises two freely rotating rollers, mounted respectively on one of the ends of a lever itself mounted so as to rotate freely on the support structure, the respective axes of rotation of the rollers and of the lever being mutually parallel.

12. Machine according to claim 7, wherein the second means comprise arms with axes perpendicular to the upright of the frame, the arms being laterally translatable and each free end of which is displaceable transversely relative to the frame.

13. Machine according to claim 12, wherein the two arms are synchronised so as to come closer to or move away from each other simultaneously and symmetrically during lateral translation and during transverse movement.

14. Machine according to claim 7, wherein the first means is arranged vertically above the third means and transversely nearer to the upright than the third means, free ends of the second means being vertically arranged between the first means and third means.

15. Machine according to claim 7, wherein the third means is arranged vertically above the first means and transversely nearer to the upright than the first means, free ends of the second means being vertically arranged between the first means and third means.

* * * * *